Dec. 27, 1927.  
M. M. KANE  
EXPLOSIVE ENGINE  
Filed Feb. 1, 1927  
1,653,856  
2 Sheets-Sheet 2
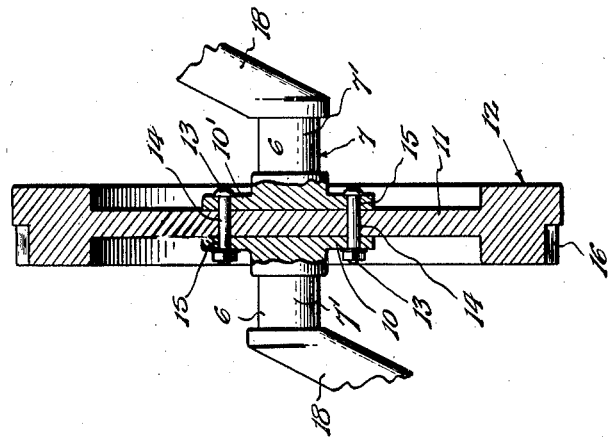
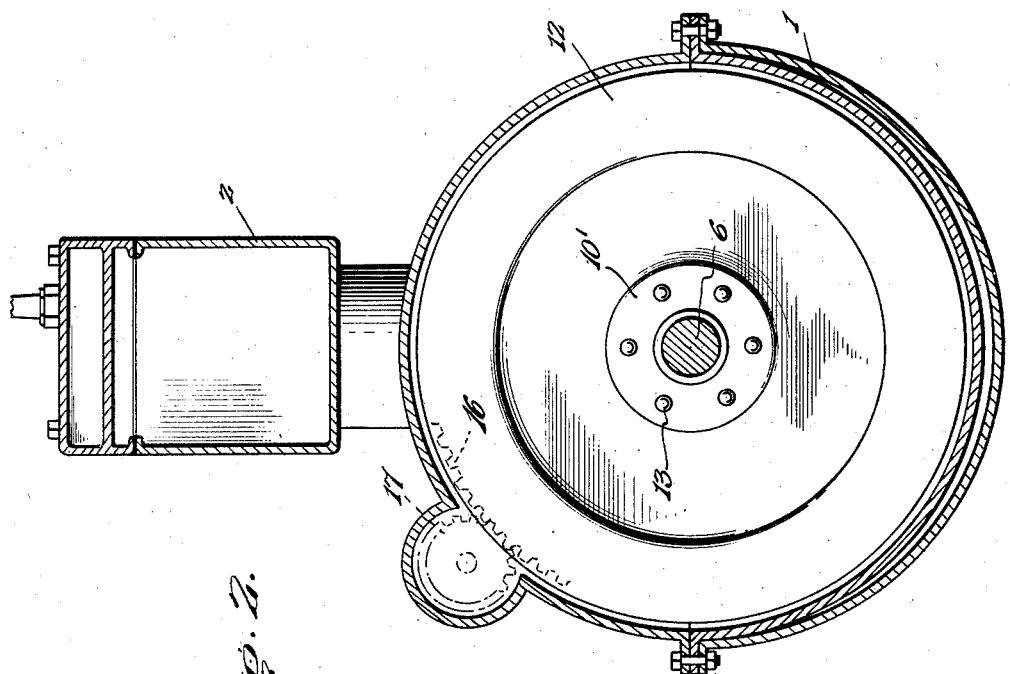
Inventor  
M. M. Kane.  
By Lacey & Lacey, Attorneys Patented Dec. 27, 1927.

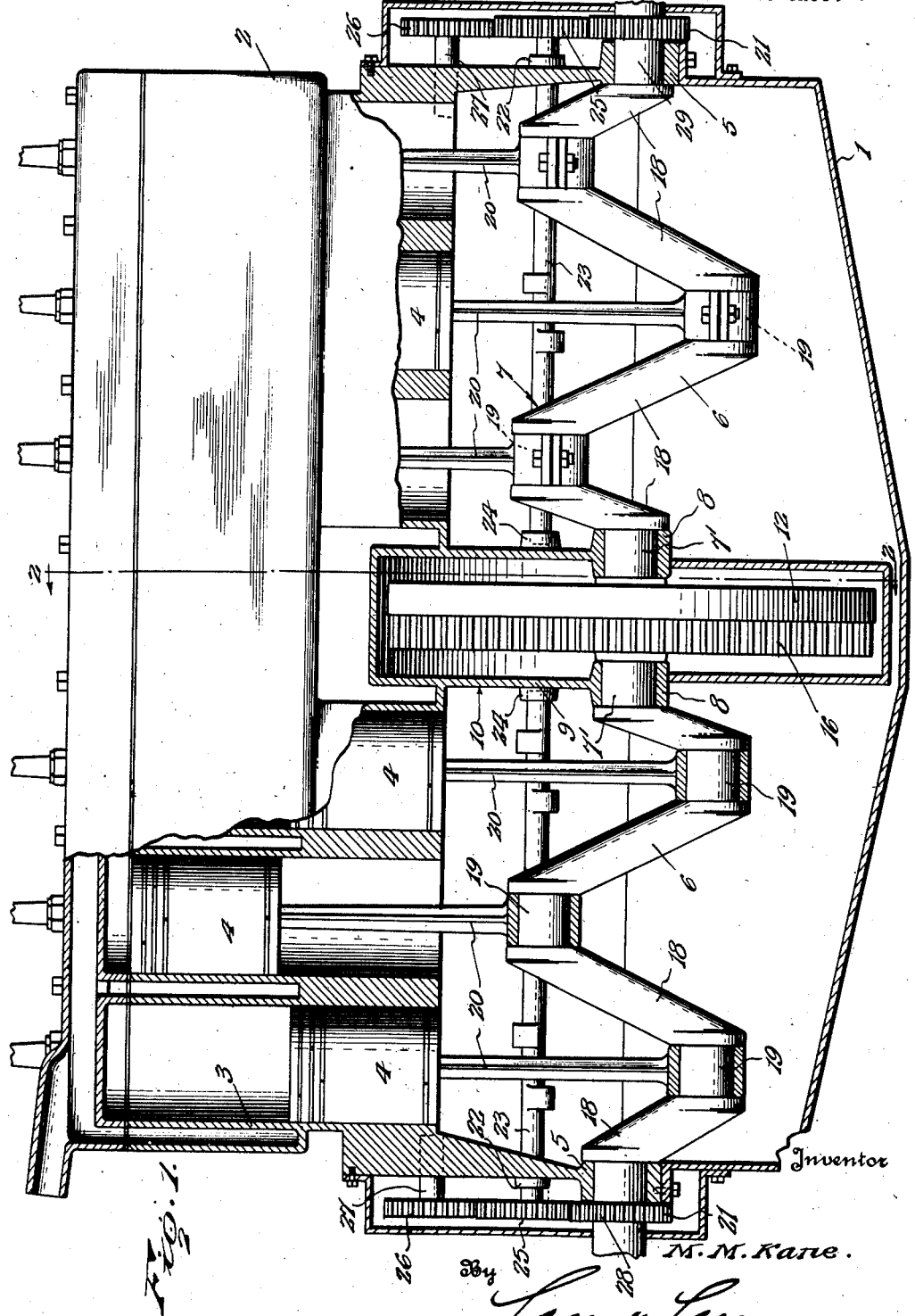

1,653,856

UNITED STATES PATENT OFFICE.

MATTHEW M. KANE, OF ROME, GEORGIA.

EXPLOSIVE ENGINE.

Application filed February 1, 1927. Serial No. 165,178.

The present invention is directed to improvements in explosive engines of the multiple cylinder type, and more particularly to the flywheel and crank shaft construction thereof.

The primary object of the invention is to provide a construction of this character wherein the flywheel is connected at the center of the crank shaft to lessen the vibration and reduce to a minimum, torsional strain upon the crank shaft, thus prolonging the life of the shaft and its bearings.

Another object of the invention is to provide a construction of this nature wherein the flywheel is connected between two crank shaft sections in order that the flywheel will be positioned centrally of a plurality of engine cylinders, and consequently, will be located relatively near the outermost or end cylinders. As is well known, the usual practice is to fix the flywheel upon the rear end of the crank shaft, but this is objectionable, owing to the fact that when the first cylinder is fired, the front end of the crank shaft tends to turn very rapidly, while the inertia of the flywheel upon the rear end of the shaft tends to prevent this rapid increase in speed and, consequently, the shaft is subjected to torsional strain and vibration, and it is to overcome this defect that the present invention has been perfected.

In the accompanying drawings:

Figure 1 is a side elevation of an internal combustion engine of the multiple cylinder type, partly in section.

Figure 2 is a sectional view on line 2—2 of Figure 1.

Figure 3 is a detail sectional view through the flywheel.

Referring to the drawings, 1 designates the crank case of an internal combustion engine, and 2 the cylinder block, in this instance an engine of the six cylinder type, and in the cylinders 3 of which reciprocate pistons 4, as usual.

The crank case 1 has its ends provided with bearings 5 in which are journaled the respective outer ends of the sections 6 of the crank shaft 7, the inner ends thereof being provided with trunnions 7′ which are journaled in the bearings 8 carried by the side walls 9 of the centrally located flywheel housing 10.

By referring to Figures 1 and 2, it will be seen that the upper section of the flywheel housing is rigid with the upper section of the crank case and the lower section of the flywheel housing is separate from its upper section and is provided with extensions disposed between the side flanges of the upper and lower crank case sections and secured by the bolts for the lower crank case section. By this arrangement the flywheel will be enclosed and the upper section of the flywheel will serve to brace the upper crank case section and also constitute means to rotatably support the inner ends of the crank shaft sections.

The trunnions 7′ of the sections 6 are disposed in direct alinement and in spaced relation, the opposed ends thereof being provided with annular flanges 10′ adapted to rest flush against the opposite sides of the web 11 of the flywheel 12. In order to securely fasten the respective sections to the flywheel, clamping bolts 13 are employed and engage in registering openings 14 and 15, formed, respectively, in the web 11 and flanges 10′, as clearly illustrated in Figure 3 of the drawings. The fly wheel 12 is of the type having a series of gear teeth 16 upon its rim which mesh with the starting gear pinion 17.

Each section 6 of the crank shaft 7 includes the usual crank arm 18 and crank pin 19, and to which are connected in any approved manner the lower ends of the piston connecting rods 20.

It will be obvious that by providing a crank shaft formed from two sections, that the flywheel can be conveniently and effectively fixed thereto, and will thus be located at the center of the crank shaft 7 and relatively near the outermost cylinder 3 of each group. In this manner, torsional strain upon the crank shaft is reduced to a minimum. Further, a construction of this kind will enable manufacturers of six and eight cylinder engines to decrease the dimensions of the crank shaft in order to provide shafts which are comparatively light and desirable in devices of this kind, and without sacrificing strength and durability.

The outer end of each crank shaft section 6 has connected thereto a timing gear 21.

Having their outer ends journaled in the ends of the crank case, as at 22, are cam shafts 23, the inner ends of which being engaged in bearing 24, carried by the housing 10. The outer ends of the cam shafts have gears 25 thereon which mesh with the gears 21.

The gears 25 mesh with the gears 26 fixed to the stub shafts 27 through the medium of which may be driven pumps, generators or any other accessory.

The forward end of the front crank section 6 is extended, as at 28 and may be shaped in any suitable manner to permit a crank to be attached thereto to start the engine when necessary. The rear end of the rear crank section 6 is extended, as at 29, in order that it may be connected with a conventional clutch structure.

Having thus described the invention, what I claim is:

A multiple cylinder engine comprising a cylinder block, a crank case having an upper section rigid with the cylinder block and a lower section separate from the upper section, said sections having end walls provided with bearings and at their sides having fastener receiving extensions, a flywheel housing intermediate the length of the crank case having an upper section rigid with the upper crank case section and a separate lower section having fastener receiving extensions disposed between the fastener receiving extensions of the crank case sections, fasteners passed through the fastener receiving extensions, the flywheel housing having its end walls provided with bearings, crank shafts in said crank case having trunnions at the outer ends journaled in the bearings of the crank case walls and trunnions at their inner ends journaled in the bearings of the flywheel housing walls and extending into the flywheel housing, and a flywheel in the flywheel housing releasably connected with the inner ends of said crank shafts.

In testimony whereof I affix my signature.

MATTHEW M. KANE. [L. S.]